(12) United States Patent
Mehringer

(10) Patent No.: US 9,057,885 B2
(45) Date of Patent: Jun. 16, 2015

(54) SAFETY, SPORT OR RECREATIONAL EYEWEAR WITH INTERCHANGEABLE OPTICAL PRESCRIPTION PVC FOIL INSERT

(76) Inventor: Andreas Mehringer, Redcliffe (AU)

( * ) Notice: Subject to any disclaimer, the term of this patent is extended or adjusted under 35 U.S.C. 154(b) by 35 days.

(21) Appl. No.: 13/811,990

(22) PCT Filed: May 18, 2011

(86) PCT No.: PCT/AU2011/000587
§ 371 (c)(1),
(2), (4) Date: Jan. 24, 2013

(87) PCT Pub. No.: WO2012/016270
PCT Pub. Date: Feb. 9, 2012

(65) Prior Publication Data
US 2013/0120709 A1   May 16, 2013

(30) Foreign Application Priority Data

Aug. 4, 2010 (AU) .................................. 2010100819

(51) Int. Cl.
*G02C 3/00* (2006.01)
*G02C 7/16* (2006.01)
*G02C 7/02* (2006.01)
*G02C 7/08* (2006.01)
*G02C 9/04* (2006.01)

(52) U.S. Cl.
CPC ................ *G02C 7/022* (2013.01); *G02C 7/086* (2013.01); *G02C 9/04* (2013.01)

(58) Field of Classification Search
USPC .......... 351/159.57, 159.48, 159.41, 41–4, 57, 351/58
See application file for complete search history.

(56) References Cited

U.S. PATENT DOCUMENTS

| 4,729,650 A * | 3/1988 | Jennings ..................... 351/47 |
| 5,000,558 A | 3/1991 | Blackstone |
| 6,241,352 B1 * | 6/2001 | Metcalfe ..................... 351/47 |
| 2007/0115424 A1 * | 5/2007 | Froissard ..................... 351/41 |
| 2010/0141891 A1 | 6/2010 | Stanley et al. |

FOREIGN PATENT DOCUMENTS

| WO | 0104692 A1 | 1/2001 |
| WO | 2006099508 A1 | 9/2006 |

* cited by examiner

*Primary Examiner* — Ricky Mack
*Assistant Examiner* — Mustak Choudhury
(74) *Attorney, Agent, or Firm* — David A. Guerra

(57) ABSTRACT

The present invention relates to safety or sport or recreational eyewear with an interchangeable optical PVC foil inserts. The eyewear includes a polycarbonate frame configured to receive interchangeable PVC prescription foil inserts. The frame includes a central nose bridge portion, molded lenses, nose pads, first and second wrap around frame arms, first and second frame arm hinge gussets. Arm hinge gussets strengthen the frame hinge and locate the foil insert in position. Inner hinges securely attach and lock the foil insert into its correct location within the frame. The foil insert provides two inner foil radiuses for the fitting of prescription corrective lenses. Nose bridge and nose pads hooks are supplied to ensure correct central alignment of the optical foil insert. Foil gusset slots ensure correct alignment of the foil insert at the top and base of the frame arm hinge gussets.

10 Claims, 1 Drawing Sheet

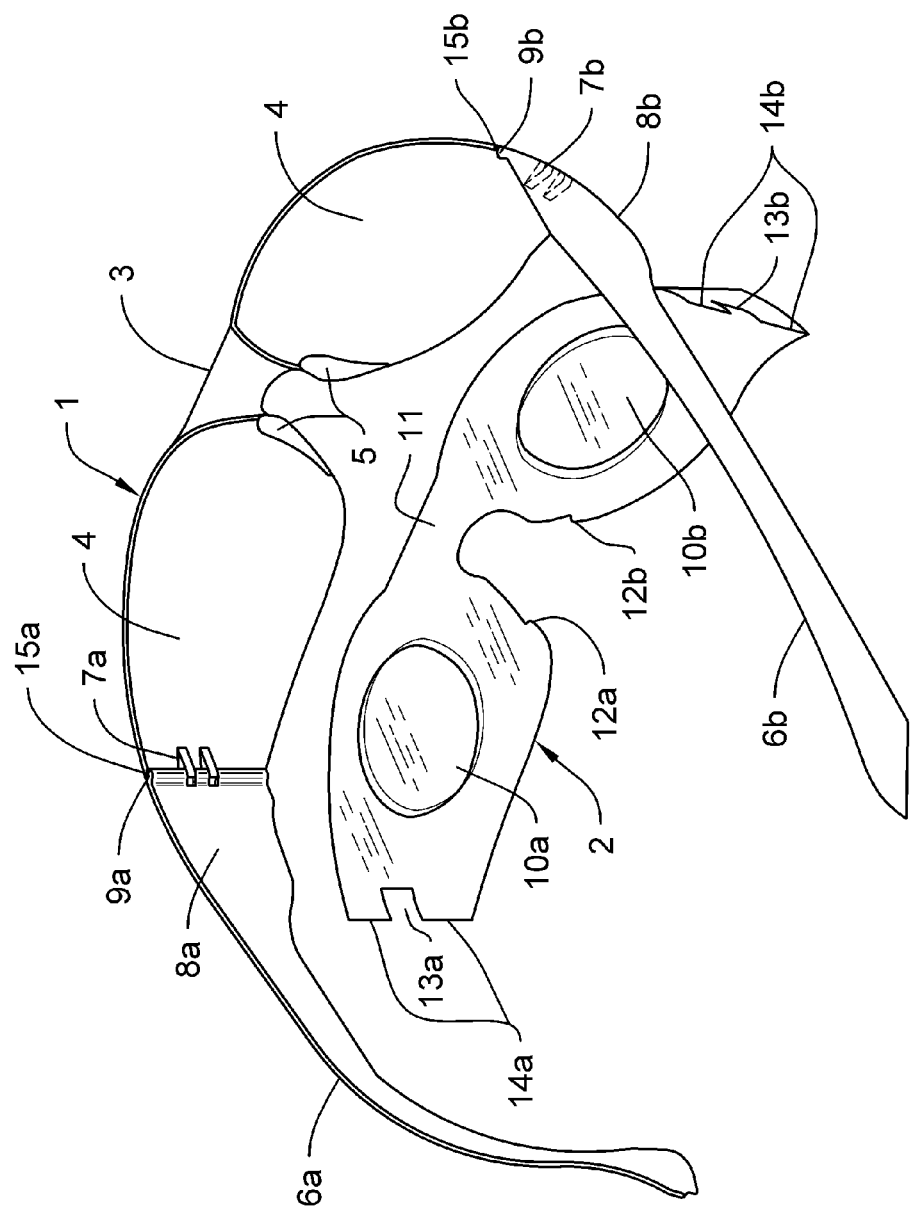

SAFETY, SPORT OR RECREATIONAL EYEWEAR WITH INTERCHANGEABLE OPTICAL PRESCRIPTION PVC FOIL INSERT

CROSS-REFERENCE TO RELATED APPLICATION

This application is an U.S. national phase application under 35 U.S.C. §371 based upon co-pending International Application No. PCT/AU2011/000587 filed on May 18, 2011. Additionally, this U.S. national phase application claims the benefit of priority of co-pending International Application No. PCT/AU2011/000587 filed on May 18, 2011 and Australia Application No. 2010100819 filed on Aug. 4, 2010. The entire disclosures of the prior applications are incorporated herein by reference. The international application was published on Feb. 9, 2012 under Publication No. WO 2012/016270 A1.

BACKGROUND OF THE INVENTION

1. Field of the Invention

The present invention relates to an optical prescription PVC foil insert for use in connection with providing eyewear with interchangeable optical prescription inserts.

2. Description of the Prior Art

There have been previous attempts to insert optical prescription lenses onto or into safety, sport or recreational eyewear such as interchangeable screw in type single lenses which are expensive to replace when damaged or scratched and not easily removed and replaced, and, prescription optical safety lenses attached directly into the optical frame or onto the outer or inner protective lens resulting in flat style protective frames fitted with protective side shields. The principle disadvantages of these previous constrictions are that once the optical lenses become scratched or damaged there is considerable expense and replacement times meaning that the wearer's safety and those working around him/her on the job is jeopardized while waiting for replacement optical safety glasses from their optician or supplier. These previous attempts result in the frame being further away from the wearers face allowing small gaps between the wearer's protective frame and the wearer's orbital area thus increasing the risk of flying particles breaching the frame integrity.

Therefore, a need exists for a new and improved eyewear with interchangeable optical prescription insert that can be used for providing eyewear with interchangeable optical prescription inserts. In this regard, the present invention substantially fulfills this need. In this respect, the eyewear with interchangeable optical prescription insert according to the present invention substantially departs from the conventional concepts and designs of the prior art, and in doing so provide an apparatus primarily developed for the purpose of providing eyewear with interchangeable optical prescription inserts.

SUMMARY OF THE INVENTION

In view of the foregoing disadvantages inherent in the known types of optical prescription lenses now present in the prior art, the present invention provides an improved eyewear with interchangeable optical prescription insert, and overcomes the above-mentioned disadvantages and drawbacks of the prior art. As such, the general purpose of the present invention, which will be described subsequently in greater detail, is to provide a new and improved eyewear with interchangeable optical prescription insert and method which has all the advantages of the prior art mentioned heretofore and many novel features that result in an eyewear with interchangeable optical prescription insert which is not anticipated, rendered obvious, suggested, or even implied by the prior art, either alone or in any combination thereof.

To attain this, the present invention essentially comprises an eyewear having a frame and at least one optical foil insert removably secured to and conforming to an inner radius of the frame. The frame has at least one lens, a first frame arm and a second frame arm each hingedly coupled to the frame. The first and second frame arms each including an inner hinge, at least one hinge gusset and at least one hinge crevice defined in the inner hinge. The optical foil insert has locking prongs integrated with each end of the optical foil insert. The hinge gusset and inner hinge each are respectively configured to locate the optical foil insert in predetermined position in relation with the inner radius of the frame. Each of the locking prongs of the optical foil insert is received into the hinge crevice, respectively, to lock and secure the optical foil insert into the predetermined position.

There has thus been outlined, rather broadly, the more important features of the invention in order that the detailed description thereof that follows may be better understood and in order that the present contribution to the art may be better appreciated.

The optical foil insert may also include at least one foil gusset slot defined into each end of the optical foil insert. The foil gusset slot is each configured to align the optical foil insert at a top and a base of the hinge gusset respectively. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved eyewear with interchangeable optical prescription insert that has all of the advantages of the prior art optical prescription lenses and none of the disadvantages.

It is another object of the present invention to provide a new and improved eyewear with interchangeable optical prescription insert that may be easily and efficiently manufactured and marketed.

An even further object of the present invention is to provide a new and improved eyewear with interchangeable optical prescription insert that has a low cost of manufacture with regard to both materials and labor, and which accordingly is then susceptible of low prices of sale to the consuming public, thereby making such eyewear with interchangeable optical prescription insert economically available to the buying public.

Still another object of the present invention is to provide a new eyewear with interchangeable optical prescription insert that provides in the apparatuses and methods of the prior art some of the advantages thereof, while simultaneously overcoming some of the disadvantages normally associated therewith.

Even still another object of the present invention is to provide an eyewear with interchangeable optical prescription insert for providing eyewear with interchangeable optical prescription inserts. This allows maximum clearance between a back surface of the optical lenses and an outer surface of the wearer's pupils, thus ensuring the wearer has a complete wrap around protective shield and optically stable vision at all times. The Polycarbonate protective frame ensures the protection of the fitted prescription optical lenses from scratching or damage as the PVC optical foil is attached to the inside face of the polycarbonate frame.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the eyewear with interchangeable optical prescription insert constructed in accordance with the principles of the present invention.

DETAILED DESCRIPTION OF THE INVENTION

In FIG. 1, a new and improved eyewear with interchangeable optical prescription insert of the present invention for providing eyewear with interchangeable optical prescription inserts is illustrated and will be described. A Polycarbonate Frame 1 manufactured to house an interchangeable polyvinyl chloride (PVC) prescription optical foil 2. The foil 2 is manufactured to conform to dimensions of the polycarbonate frame 1. The polycarbonate frame 1 includes a central nose bridge portion 3, molded lenses 4, nose pads 5, first and second wrap around frame arms 6a, 6b, and first and second frame arm hinge gussets 7a, 7b. The arm hinge gussets 7a, 7b are designed to strengthen the frame hinge and locate the PVC prescription optical foil 2 in its correct optical position.

The frame 1 additionally includes broad outer temples 8a, 8b, deep inner hinges 9a, 9b to securely attach and lock the prescription optical foil 2 into its correct location within the frame. The prescription optical foil 2 provides two inner foil radiuses 10a, 10b for the fitting of prescription corrective lenses. A nose bridge 11 is compatible with the nose bridge of the polycarbonate frame 1, and nose pad hooks 12a, 12b are supplied to ensure correct central alignment end location of the prescription optical foil 2. Foil gusset slots 13a, 13b are provided to ensure the correct alignment of the prescription optical foil 2 at the top and base of the frame arm hinge gussets 7a, 7b. Foil locking prongs 14a, 14b are slotted into a front crevice 15a, 15b of the deep inner hinges 9a, 9b to lock and secure the prescription optical foil 2 into its proper place.

This invention relates to and comprises of safety or sport or recreational eyewear with an interchangeable optical PVC foil with pupil distances up to 60 mm, 64 mm and above 64 mm capable of being fitted with prescription optical lenses including single lens, bifocal lens or multifocal lens with a base curve not exceeding 4.75, optical correction up to +/−10 dpt and lens grooves 0.6 mm in width by 0.9 mm in depth for incorporation into a specifically designed safety or sport wrap around polycarbonate protective frame approved to Australian Standard 1337. The polycarbonate protective frame has no optical distortion which ensures and maintains correct refractive vision and excellent eye protection under all workplace, sporting or recreational activities.

The PVC prescription optical foil insert is securely fitted to the inside face of the protective polycarbonate safety frame by way of two locking prongs being positioned and locked into the front crevice of each hinge of the wrap around polycarbonate protective frame and follows the inside radius of the protective polycarbonate frame when fitted, ensuring maximum clearance between the back surface of the optical lenses and the outer surface of the wearer's pupils, this ensures the wearer has a complete wrap around protective shield and ensures optically stable vision at all times.

The Polycarbonate protective frame ensures the protection of the fitted prescription optical lenses from scratching or damage as the PVC optical foil is attached to the inside face of the polycarbonate frame.

The invention claimed is:

1. An eyewear comprising:
   a frame comprising at least one lens, a first frame arm and a second frame arm each hingedly coupled to said frame, said first and second frame arms each including an inner hinge, at least one hinge gusset and at least one hinge crevice defined in said inner hinge; and
   at least one optical foil insert removably secured to and conforming to an inner radius of said frame and said lens, said optical foil insert having locking prongs integrated with each end of said optical foil insert;
   wherein said hinge gusset and said inner hinge each are respectively configured to locate said optical foil insert in predetermined position in relation with said inner radius of said frame;
   wherein each of said locking prongs of said optical foil insert are received into said hinge crevice, respectively, to lock and secure said optical foil insert into said predetermined position;
   wherein said optical foil insert further comprising two inner radiuses configured to fit at least one prescription corrective lens into said optical foil insert.

2. The eyewear according to claim 1, wherein said optical foil insert further comprising at least one foil gusset slot defined into each end of said optical foil insert, said foil gusset slot are each configured to align said optical foil insert at a top and a base of said hinge gusset respectively.

3. The eyewear according to claim 2, wherein said frame further comprising a central nose bridge portion.

4. The eyewear according to claim 3, wherein said optical foil insert further comprising an insert nose bridge compatible with said central nose bridge portion of said frame, and at least one nose pad hook integrated with said insert nose bridge, said nose pad hook being configured to centrally align said optical foil insert when attached to said frame.

5. The eyewear according to claim 1, wherein said first and second frame arms each further comprising an outer temple portion adjacent said inner hinge respectively, said outer temple portion each having a size larger than a size of said first and second frame arms respectively.

6. The eyewear according to claim 1, wherein said inner hinge, said hinge gusset and said hinge crevice are each integrally molded on said frame.

7. The eyewear according to claim 1, wherein said lens is made of polycarbonate, said optical foil insert is made of polyvinyl chloride (PVC).

8. The eyewear according to claim 1, wherein said optical foil insert is at least one prescription optical lens selected from the group consisting of a single lens, a bifocal lens, and a multifocal lens.

9. The eyewear according to claim 8, wherein said prescription optical lens has a base curve less than or equal to 4.75.

10. The eyewear according to claim 8, wherein said prescription optical lens has optical correction up to +/−10 dpt and lens grooves of 0.6 mm in width by 0.9 mm in depth.

* * * * *